(12) United States Patent
Cimpu et al.

(10) Patent No.: US 11,671,838 B2
(45) Date of Patent: Jun. 6, 2023

(54) METHODS AND NODES FOR NEGOTIATING CITIZENS BROADBAND RADIO SERVICE DEVICES ACTIVE ANTENNA SYSTEM ANTENNA PATTERN AND RADIO PLANNING FOR CITIZEN'S BROADBAND RADIO SERVICE BAND

(71) Applicant: TELEFONAKTIEBOLAGET LM ERICSSON (PUBL), Stockholm (SE)

(72) Inventors: Virgil Cimpu, Ottawa (CA); Junying Liu, Lund (SE); Mats Buchmayer, Enskede Gard (SE); Fredric Kronestedt, Bromma (SE); Magnus Lundevall, Solna (SE); Chris Williams, Nepean (CA); Gary Boudreau, Kanata (CA); Kumar Balachandran, Pleasanton, CA (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/761,891

(22) PCT Filed: Sep. 25, 2020

(86) PCT No.: PCT/IB2020/059008
§ 371 (c)(1),
(2) Date: Mar. 18, 2022

(87) PCT Pub. No.: WO2021/059237
PCT Pub. Date: Apr. 1, 2021

(65) Prior Publication Data
US 2022/0338017 A1 Oct. 20, 2022

Related U.S. Application Data

(60) Provisional application No. 62/906,390, filed on Sep. 26, 2019.

(51) Int. Cl.
*H04W 24/02* (2009.01)
*H04W 16/10* (2009.01)
*H04W 16/28* (2009.01)

(52) U.S. Cl.
CPC .......... *H04W 16/10* (2013.01); *H04W 16/28* (2013.01); *H04W 24/02* (2013.01)

(58) Field of Classification Search
CPC ..... H04W 16/10; H04W 16/28; H04W 24/02; H04W 16/14; H04B 7/0617; H04B 7/063;
(Continued)

(56) References Cited

U.S. PATENT DOCUMENTS

2018/0048360 A1\* 2/2018 Athley ................. H04W 48/18

FOREIGN PATENT DOCUMENTS

| WO | 2016096001 A1 | 6/2016 |
| WO | WO-2016096001 A1 \* | 6/2016 |
| WO | 20182194391 A1 | 12/2018 |

\* cited by examiner

*Primary Examiner* — Chuong A Ngo
(74) *Attorney, Agent, or Firm* — Ericsson Inc.

(57) ABSTRACT

There is provided a method in a first network node (e.g. CBSD) for negotiating AAS antenna pattern and for radio planning. The method comprises: determining (310) one or more cell shaping parameters; sending (320) the determined cell shaping parameters to a second network node (e.g. SAS or CxM); receiving (330) an allocation of resources based on the determined cell shaping parameters. Another method is disclosed as well and may comprise: receiving (160) an envelope of radio frequency power for maximizing a coverage area, from a second network node (e.g. SAS); determining (170) a beam pattern based on the received envelope; sending (180) the determined beam pattern to the second node.

18 Claims, 16 Drawing Sheets

(58) Field of Classification Search
CPC .............. H04B 7/0848; H04L 41/0806; H04L 41/0895

See application file for complete search history.

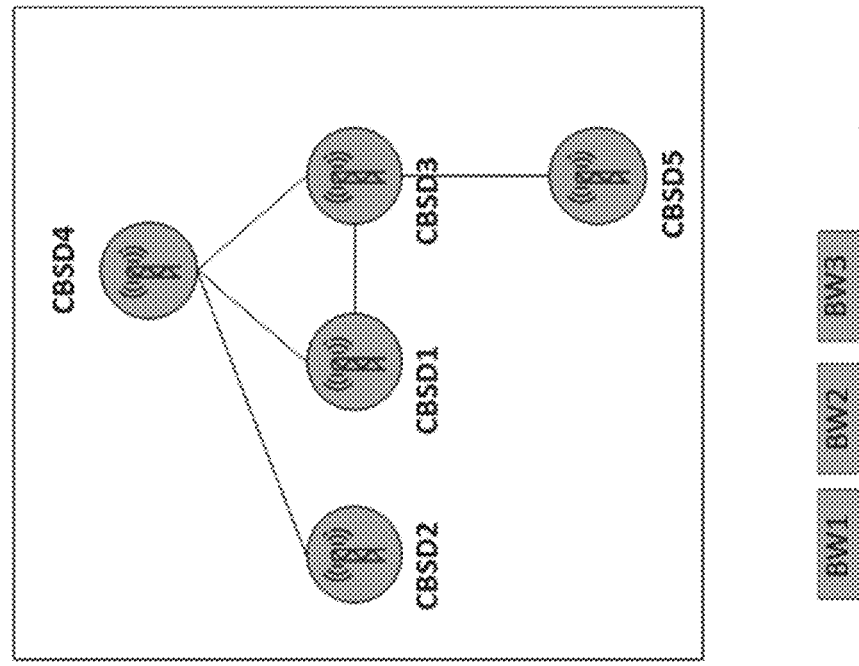
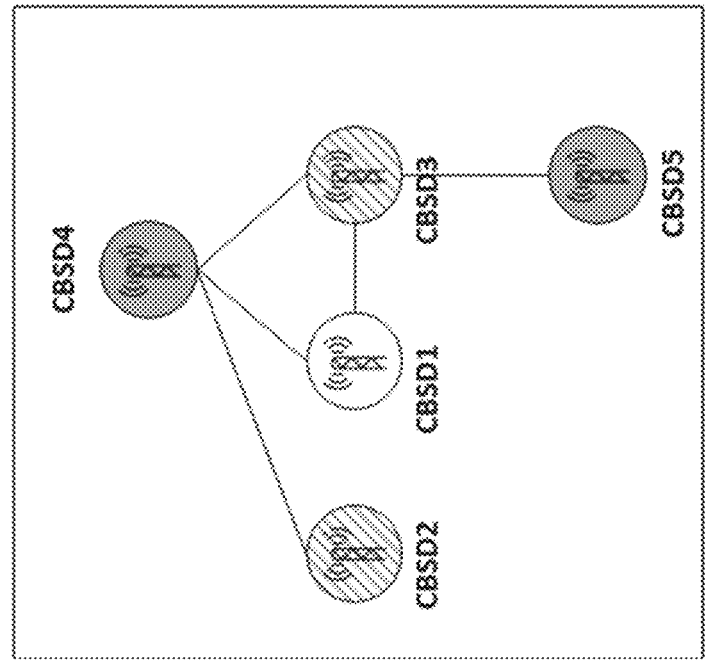
Figure 14

METHODS AND NODES FOR NEGOTIATING CITIZENS BROADBAND RADIO SERVICE DEVICES ACTIVE ANTENNA SYSTEM ANTENNA PATTERN AND RADIO PLANNING FOR CITIZEN'S BROADBAND RADIO SERVICE BAND

RELATED APPLICATIONS

This application claims the benefits of priority of U.S. Provisional Patent Application No. 62/906,390, entitled "Methods and nodes for negotiating CBSD AAS antenna pattern and radio planning for CBRS Band" and filed at the United States Patent and Trademark Office on Sep. 26, 2019, the content of which is incorporated herein by reference.

TECHNICAL FIELD

The present description generally relates to wireless communication systems and more specifically to using Active Antenna System (AAS) antenna patterns in the Citizen's Broadband Radio Service (CBRS) band.

BACKGROUND

Spectrum is the lifeblood of modern cellular communication, and current building practices for wireless mobile communications have focused on designing systems for wide area coverage in frequency bands that roughly extend between 400 MHz to 6 GHz, although there is no physical limitation that strictly limits such systems to that range. The traffic growth on mobile networks has grown to the point where the mobile industry is consistently starved for spectrum. The mobile industry has also created a role for spectrum within the economics of the industry. A large fraction of spectrum assigned for commercial mobile services has been via competitive auctions by regulators. Operators who submit winning bids for spectrum gain economic value from using the spectrum for serving mobile traffic. In return, regulators benefit from having a licensee who is motivated to utilize the spectrum in a productive manner by deploying systems in a way that covers a large fraction of a served population, for example, up to 95% of subscribers.

Every generation of wireless technology has improved the metrics underlying spectrum efficiency, typically measured as area efficiency and denominated in the ratio data rate supported per unit bandwidth per cell ((b/s)/Hz/cell).

In the United States, a Presidential Memorandum directing the Federal Communications Commission (FCC) to identify federal spectrum for release to mobile services resulted in a report by the Presidential Council of Advisors on Science and Technology (PCAST) that recommended that spectrum held by the federal Government be released to the mobile industry in a three-tier sharing arrangement. This memorandum has resulted in FCC regulations codified in the Report and Order for the Citizen's Broadband Radio Service (CBRS) defined for the 3550-3700 MHz band. As in the PCAST report, the CBRS defines three tiers of sharing, with higher tiers providing higher priority of access to spectrum than the lower ones. In general, multiple tiers of users can be defined, although three tiers are a pragmatic choice. The assignment of channels to different tiers and related configurations are performed by a geolocation database and policy management system known as the Spectrum Access System (SAS). In the CBRS, naval radar in littoral waters, and commercial Fixed Satellite Service (FSS) compose the incumbents. The second tier consists of Priority Access Licenses (PALs), and the third tier comprises opportunistic users known as General Authorized Access (GAA) users. Incumbent radar activity in the CBRS is dynamic, while FSS (space-to-earth) is static. The SAS is charged with protecting incumbents, and PALs. In addition, the SAS authorizes the use of spectrum to GAA users.

Accessing spectrum in 3.5 GHz (CBRS band) is performed following standards defined in WinnForum. A Citizens Broadband Radio Service Devices (CBSD) will first register with the SAS and provide its location information among other registration parameters, and then it will ask the SAS to grant access in a certain channel. Before granting access, the SAS will use information from the Environmental Sensing Capability (ESC) network to detect incumbent activity in the area where a CBSD operates. The SAS will also use measurement reports from the other CBSDs in the same area to determine the level of interference in a certain channel as well as if the channel needs to be protected due to PAL user activity. FIG. 1 illustrates the CBRS architecture.

Active Antenna Systems (AAS) technology allows beam forming as well as null creation in different directions. This feature can be used to minimize the radiated power in certain directions, which in turn will minimize interference.

SUMMARY

Currently there exists some challenges. For example, the current method used by the SAS to protect higher tier levels (incumbents, PAL), is to compute the interference level from a given CBSD to the location of the incumbent using an antenna pattern that has been provided by that CBSD during registration. When the computed interference level is too high, the SAS will reduce the overall Equivalent Isotropically Radiated Power (EIRP) of the CBSD until the interference level is below the acceptable threshold. While this method will reduce the interference, it will also reduce the useful coverage level of the CBSD.

In the CBRS band, the entity of CBSD, a Co-existence Manager (CxM) or a Domain Proxy has the possibility to select channel, and the SAS has responsibility to ensure interference protection according to the rules set out in FCC part 96. Existing operators and new customers are interested in deploying both New Radio (NR) and Long Term Evolution (LTE) in the CBRS band and in advanced/active antenna system (AAS) to improve coverage, capacity and user experience. In the context of CBRS, beam forming can provide additional benefits by mitigating interference with specific beam steering. However, how to use AAS characteristics in CBRS band to perform radio resource planning and where to do this planning to mitigate interference are currently undefined in the CBRS standards.

Some embodiments allow the CBSDs and the CBRS network to overcome or mitigate the challenges as described above.

The embodiments provide a method to negotiate the antenna pattern between a CBSD using Active Antenna System and the SAS. This will allow the CBSD to protect the higher tiers from interference without reducing the EIRP in all directions.

For example, following a CBSD node installation and the registration procedure, a SAS/CxM will provide the direction of the incumbents to be protected around the CBSD and granted spectrums. CBSDs will calculate the expected service area according to the allowed interference to neighboring cells, and the traffic distribution as well as the incumbents' location, and then select the proper beam width and tilt-value. The CBSDs will report the new cell shaping parameters to the SAS/CxM, and the SAS/CxM will confirm the new cell shaping parameters and re-assign spectrum to the grouped CBSDs if needed.

According to an aspect, there are provided methods performed by a network node/controlling node for radio resource planning and/or mitigating interferences. A first method may comprise: determining an envelope of radio frequency power for maximizing a coverage area; sending the determined envelope to a second network node; receiving an antenna pattern based on the determined envelope, from the second network node; determining that the received antenna pattern fits within the determined envelope. A second method may comprise: receiving an envelope of radio frequency power for maximizing a coverage area, from a second network node; determining an antenna pattern based on the received envelope; sending the determined antenna pattern to the second node. A third method may comprise: determining one or more cell shaping parameters; sending the determined cell shaping parameters to a second network node; receiving an allocation of resources based on the determined cell shaping parameters. A fourth method may comprise: receiving one or more cell shaping parameters from a second network node; determining an allocation of resources based on the received one or more cell shaping parameters.

According to another aspect, some embodiments include a network node/controlling node configured, or operable, to perform one or more functionalities (e.g. actions, operations, steps, etc.) as described herein.

In some embodiments, the network node/controlling node may comprise one or more communication interfaces configured to communicate with one or more other radio nodes and/or with one or more network nodes, and processing circuitry operatively connected to the communication interface, the processing circuitry being configured to perform one or more functionalities as described herein. In some embodiments, the processing circuitry may comprise at least one processor and at least one memory storing instructions which, upon being executed by the processor, configure the at least one processor to perform one or more functionalities as described herein.

In some embodiments, the network node/controlling node may comprise one or more functional modules configured to perform one or more functionalities as described herein.

According to yet another aspect, some embodiments include a non-transitory computer-readable medium storing a computer program product comprising instructions which, upon being executed by processing circuitry (e.g., at least one processor) of the network node/controlling node, configure the processing circuitry to perform one or more functionalities as described herein.

An advantage of the embodiments for AAS antenna pattern negotiation is improving AAS-based CBSD coverage while fulfilling the Part 96 requirements to protect higher tier users. The radio planning solution mitigates interference from/to CBSD and improves the reliability and efficiency of spectrum assignment in a CBSD by utilizing the proposed cell shaping method. The proposed radio planning method is to select proper wide beams and tilt value for each sector which will adapt to traffic distribution, incumbents' location and interference from neighbor cells.

This summary is not an extensive overview of all contemplated embodiments and is not intended to identify key or critical aspects or features of any or all embodiments or to delineate the scope of any or all embodiments. In that sense, other aspects and features will become apparent to those ordinarily skilled in the art upon review of the following description of specific embodiments in conjunction with the accompanying figures.

BRIEF DESCRIPTION OF THE DRAWINGS

Exemplary embodiments will be described in more detail with reference to the following figures, in which:

FIG. 14 illustrates an example of a spectrum assignment before and after adjusted tilt value.

DETAILED DESCRIPTION

Figure 1:
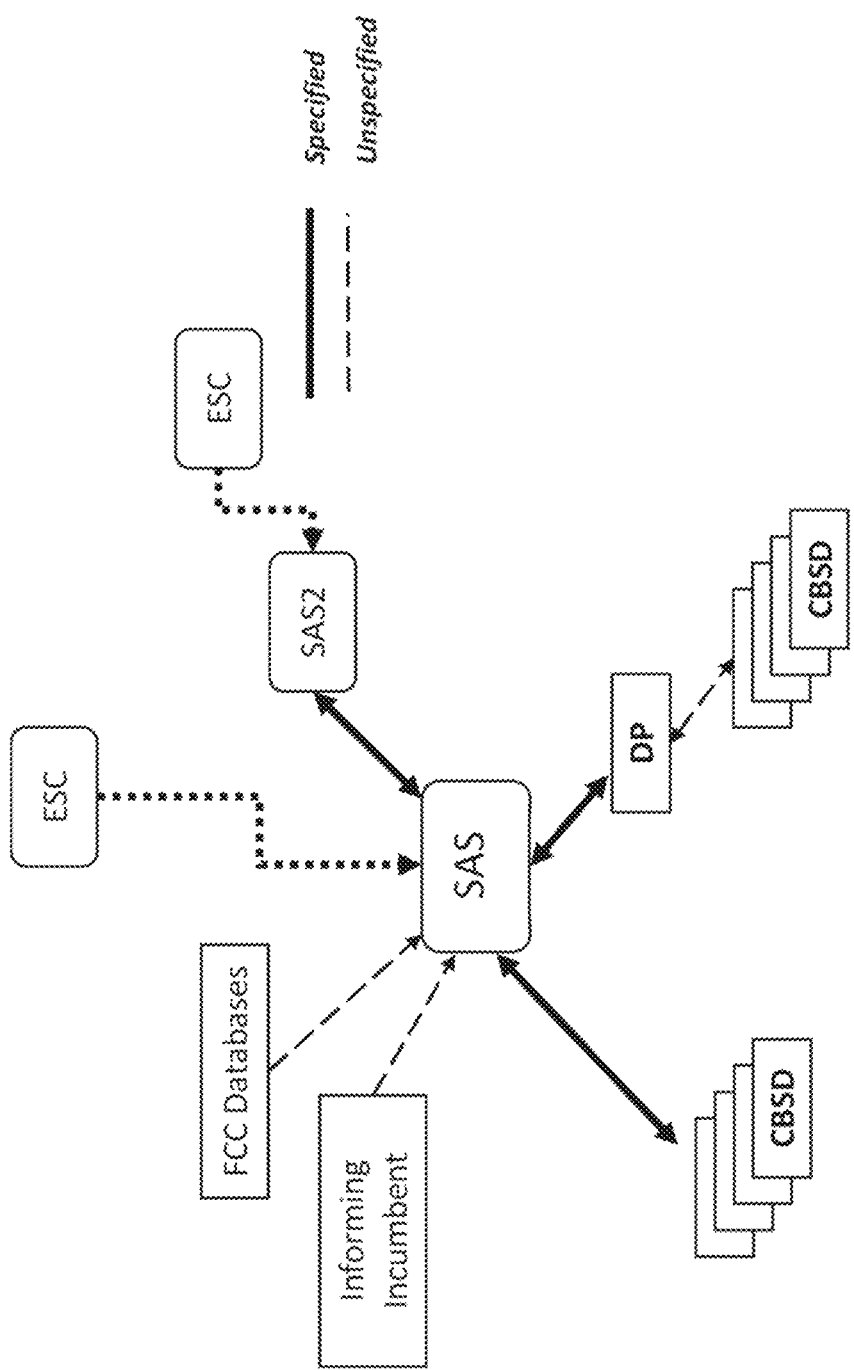
FIG. 1 illustrates a schematic illustration of a CBRS architecture.

The embodiments set forth below represent information to enable those skilled in the art to practice the embodiments. Upon reading the following description in light of the accompanying figures, those skilled in the art will understand the concepts of the description and will recognize applications of these concepts not particularly addressed herein. It should be understood that these concepts and applications fall within the scope of the description.

In the following description, numerous specific details are set forth. However, it is understood that embodiments may be practiced without these specific details. In other instances, well-known circuits, structures, and techniques have not been shown in detail in order not to obscure the understanding of the description. Those of ordinary skill in the art, with the included description, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

As used herein, the singular forms "a", "an" and "the" are intended to include the plural forms as well, unless the context clearly indicates otherwise. It will be further understood that the terms "comprises," "comprising," "includes," and/or "including" when used herein, specify the presence of stated features, integers, steps, operations, elements, and/or components, but do not preclude the presence or addition of one or more other features, integers, steps, operations, elements, components, and/or groups thereof.

Generalizations

In this disclosure, a first node and a second node are used as two nodes which are either transmitting or receiving in unlicensed spectrum (or a shared spectrum where more than one system operates based on some kind of sharing regulations). An example of a first node could be a network node, which could be a more general term and can correspond to any type of radio network node or any network node, which communicates with a UE and/or with another network node. Examples of network nodes are NodeB, base station (BS), multi-standard radio (MSR) radio node such as MSR BS, eNodeB, gNodeB. MeNB, SeNB, network controller, radio network controller (RNC), base station controller (BSC), relay, donor node controlling relay, base transceiver station (BTS), access point (AP), transmission points, transmission nodes, RRU, RRH, nodes in distributed antenna system (DAS), core network node (e.g. MSC, MME, etc.), O&M, OSS, SON, positioning node (e.g. E-SMLC), MDT, controlling node such as a SAS or CxM, etc.

The first and second network nodes are used to distinguish the two nodes from each other. The first network node can be a SAS and the second network node can be a CBSD. In other cases, the first network node can be a CBSD and the second network node can be a SAS.

Embodiments of the present disclosure provide several methods in a controlling node or network node, such as a SAS or CxM, or a network node such as a CBSD.

For example, the embodiments introduce an antenna pattern negotiation method between the SAS and an AAS-based CBSD. The antenna pattern negotiation purpose is to minimize the interference towards higher tiers (incumbents, PAL) while maximizing the useful coverage of the CBSD.

The embodiments also introduce a radio planning method. For example, following a normal installation and registration of a CBSD, the SAS/CxM will assign spectrum and provide locations of incumbents in the area to CBSDs. The CBSD will track traffic distribution from both the horizontal and vertical directions and monitor interference level from neighbor cells. The CBSD will calculate the expected service area and then select proper cell shaping parameters, such as wide beams and tilts, by calculating an optimum tilt value for each sector to adapt to traffic distribution and to mitigate interference from/to neighbor cells and incumbents.

The CBSD will report the new cell shaping parameters and interference geometry to a SAS/CxM. The SAS/CxM will coordinate all grouped CBSDs and require more measurements with the new parameters. After confirmation with the new parameters, the SAS/CxM will reassign channels to the CBSD from the pool of spectrums if needed.

Furthermore, the radio planning method will add new parameters to the existing standard interface between a SAS/CxM and a CBSD and mitigate interference from/to neighbor networks and improve efficiency of spectrum assignment.

Method for Negotiating AAS Antenna Pattern

Figure 2:
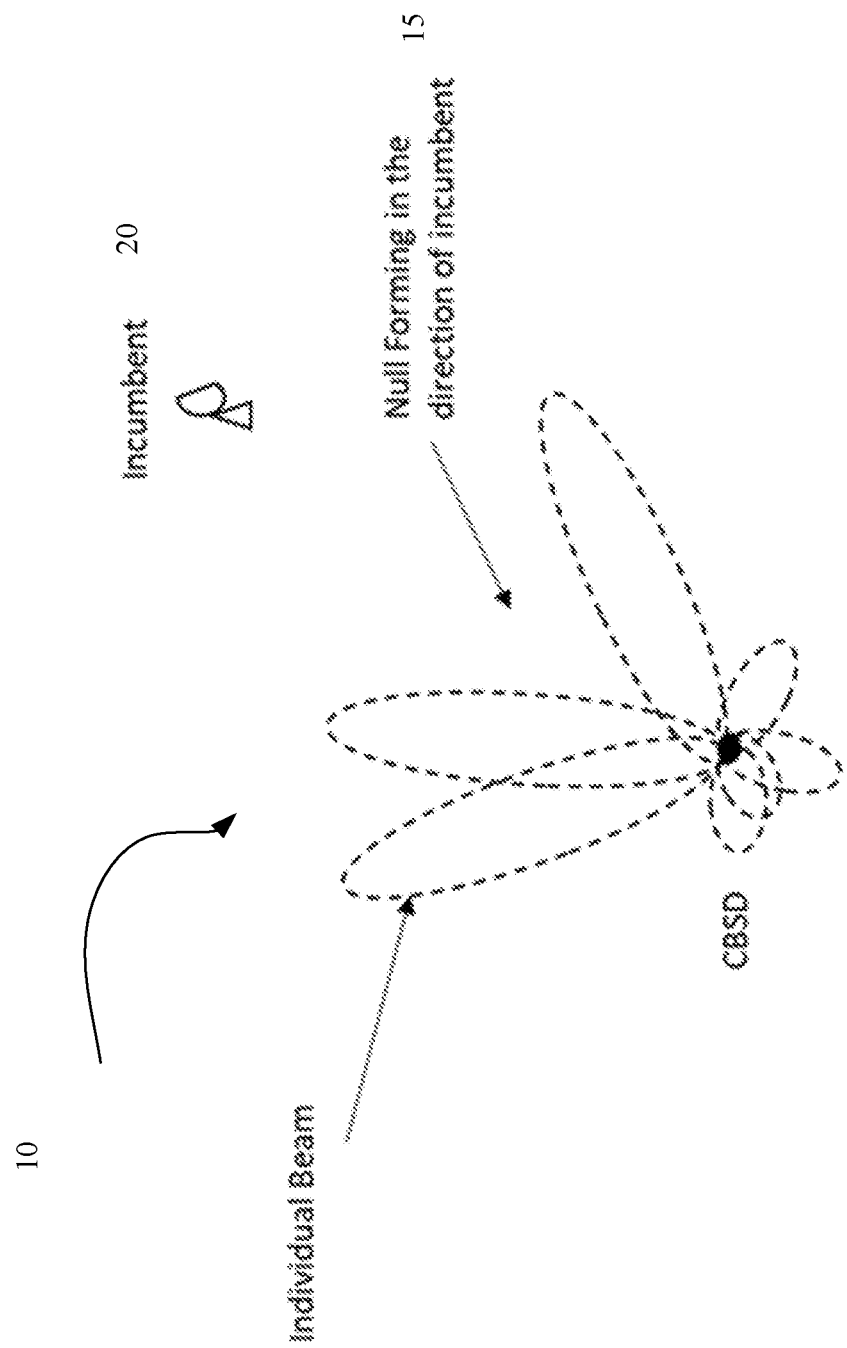
FIG. 2 illustrates AAS null forming to minimize interference to an incumbent.

For the CBSDs that use an AAS, it would be desirable not to reduce the overall EIRP in all directions to protect incumbents, but rather to use beam patterns that will allow the use of maximum EIRP in the directions where there are no incumbents while reducing the EIRP, for example by orchestrating nulls, in the direction of the incumbents. FIG. 2 illustrates a CBSD AAS beam pattern 10 that is specifically created to minimize the EIRP level in the direction of the incumbent. For example, a null 15 is formed in the direction of the incumbent 20.

Figure 3:
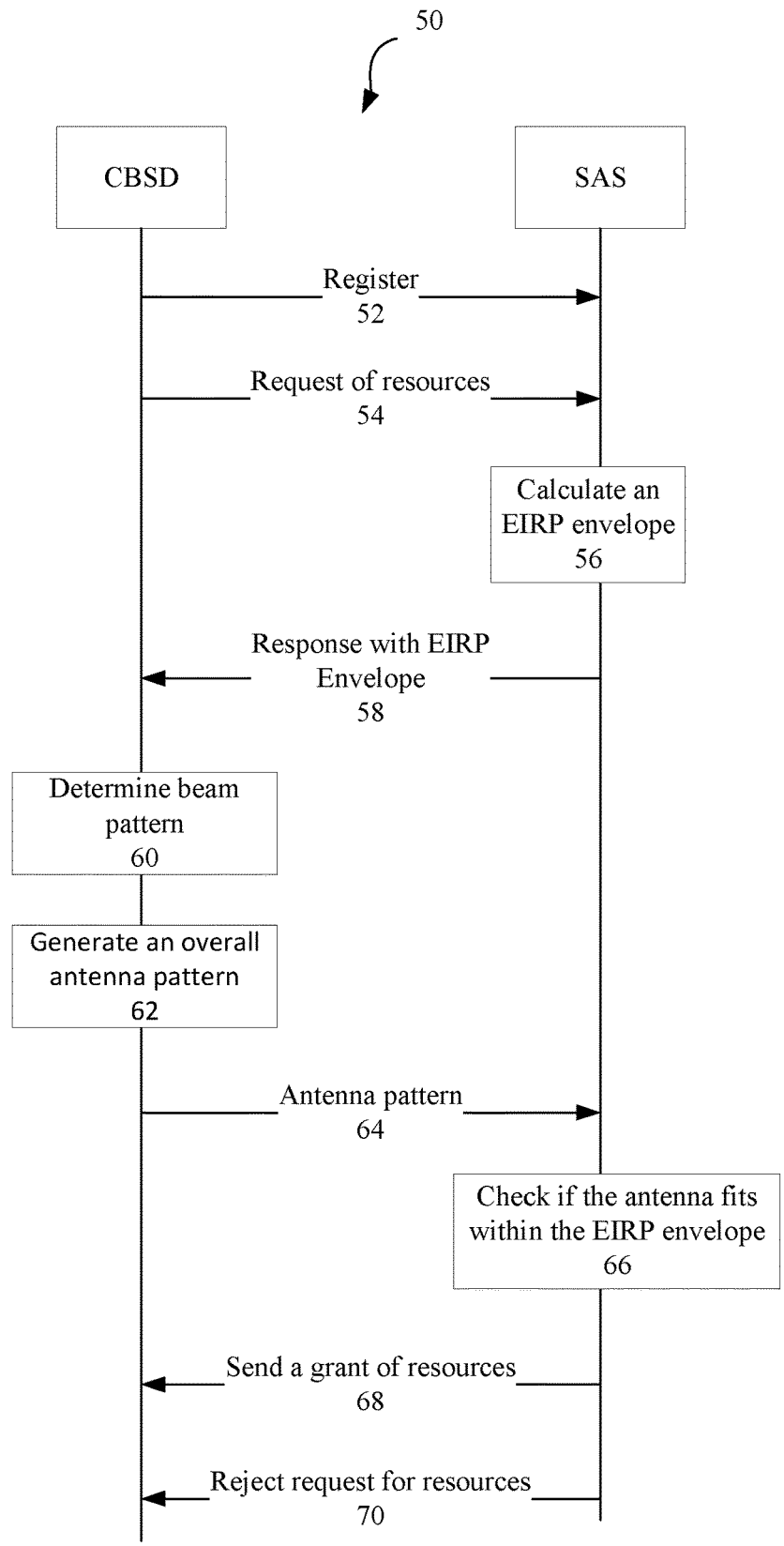
FIG. 3 is a signaling diagram between a CBSD and a SAS for negotiating an antenna pattern.

In order to achieve EIRP reduction only in the direction of the incumbents, this disclosure proposes a method for negotiating an antenna pattern between the CBSD and SAS. For some of the embodiments, the null pattern can also be in the direction of other CBSDs in addition to the incumbents, and the pattern is negotiated between the CBSD and the CxM, for example. FIG. 3 illustrates the method 50 for negotiating an antenna pattern between the CBSD and SAS.

Initially, in step 52, the AAS-based CBSD will register with the SAS and provide its location, maximum EIRP and the antenna azimuth, for example. For the antenna pattern, the CBSD will specify either an omni-directional antenna or envelope antenna pattern that traces a sector over which the antenna may operate.

Figure 4:
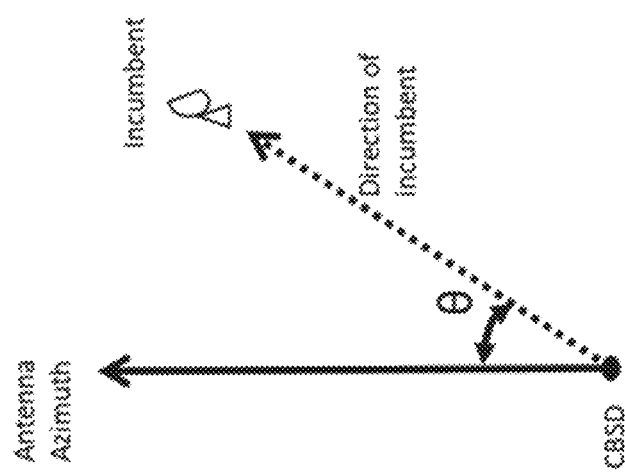
FIG. 4 is a schematic illustration of an angle between the CBSD antenna azimuth and the incumbent.

When the CBSD asks for a grant (of resources/spectrum), in step 54, the SAS will evaluate which incumbents are going to be impacted by the grant request. For each impacted incumbent, the SAS will determine how much interference room is available. The SAS can also compute the angles between the CBSD antenna azimuth and the incumbents (see FIG. 3). FIG. 4 illustrates, for example, the angle θ, between the antenna azimuth and the direction of the incumbent.

Figure 5:
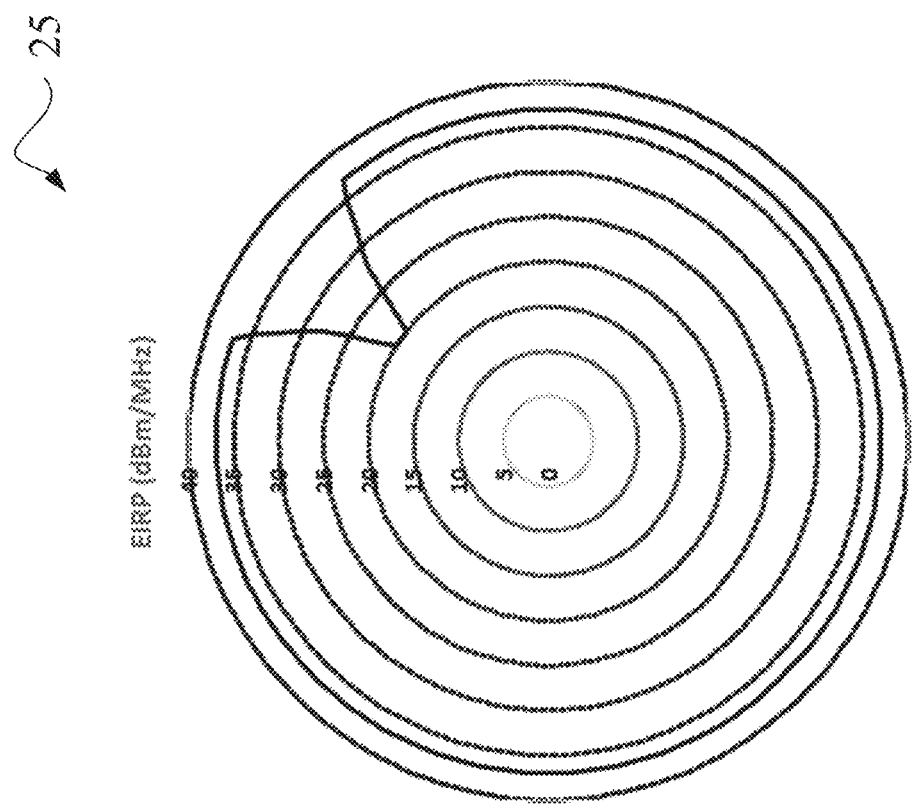
FIG. 5 illustrates a SAS computed EIRP envelope relative to the antenna azimuth.

Then, using the agreed-upon propagation models, the SAS calculates, in step 56, an overall EIRP envelope for the CBSD that will meet the interference levels at the incumbent position, and returns the EIRP envelope in a grant reply to the CBSD in step 58. For example, the agreed-upon propagation models are defined in WinnForum specifications (e.g. TS 0112 defines the model in section R2-SGN-04). Also, as an example, FIG. 5 illustrates an EIRP envelope 25 relative to the antenna azimuth, the EIRP being computed/determined by the SAS.

Figure 6:
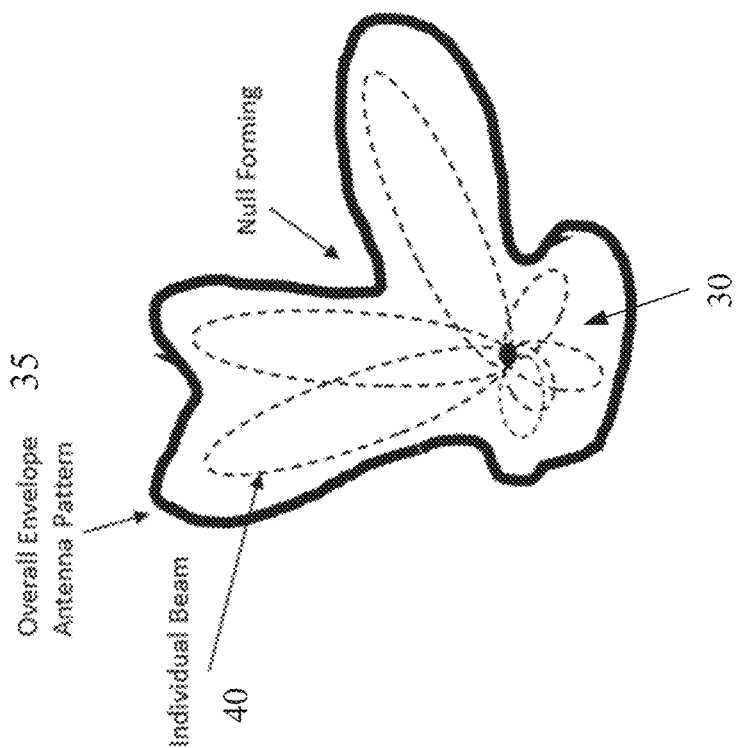
FIG. 6 illustrates a beam pattern determined by a CBSD according to an embodiment.

Once the CBSD receives the EIRP envelope from the SAS, in step 60, the CBSD can determine a beam pattern that will produce a radiation pattern which will fit within the EIRP envelope and maximize the CBRS coverage in the desired directions. FIG. 6 illustrates an exemplary beam pattern 30 determined by the CBSD.

The CBSD generates an overall antenna pattern in step 62, based on the selected beam pattern. The CBSD communicates the generated antenna pattern to the SAS along with the desired maximum EIRP value in step 64. For example, FIG. 6 illustrates an overall envelope antenna pattern 35 based on the beam pattern 30 (which includes a plurality of individual beams).

Figure 7:
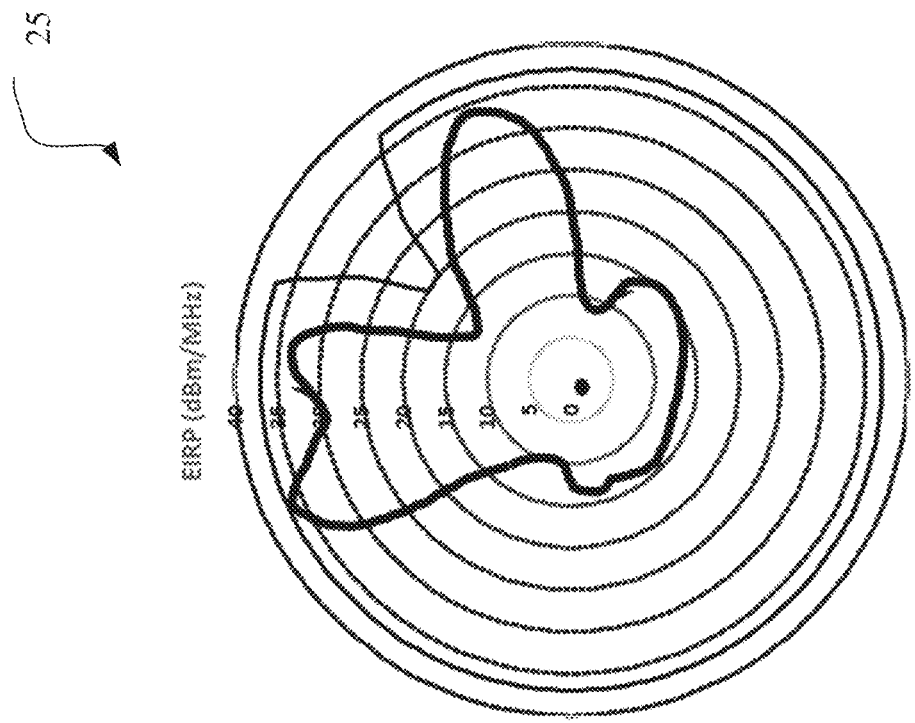
FIG. 7 illustrates that a CBSD declared antenna pattern envelope and the desired max EIRP fit within the SAS-computed EIRP envelope, according to some embodiments.

The SAS verifies if the antenna pattern 35 using the desired maximum EIRP fits within the previously calculated EIRP envelope 25, in step 56. If the antenna pattern 35 fits within the previously calculated EIRP envelope 25 then the SAS approves the grant in step 68. For example, in FIG. 7, it is shown that the antenna pattern 35 can be included within the EIRP envelope 25 determined by the SAS. In case the antenna pattern 35 does not fit within the EIRP envelope 25, the SAS rejects the request for resources in step 70. In this case, the method goes back to step 60, where the CBSD will calculate a new beam pattern that, for example, has a lower maximum EIRP and/or lower power in the direction of the incumbent to meet the EIRP envelope.

In another example, the embodiments can also be applied to mitigate interference between co-located deployments of different Time Division Duplex (TDD) configurations within a network of a single operator, or deployment of different TDD configurations among networks of different operators. In this example, the embodiments can be implemented, for example, in a CxM that calculates the antenna patterns for each CBSD in the overall network as well as determining the desired antenna pattern envelope in combination with the desired maximum EIRP to mitigate interference levels between CBSDs employing different TDD configurations to be below a target interference threshold T1. For example, the metric for the target threshold T1 could also be a signal-to-interference-plus-noise ratio (SINR) or Signal-to-leakage-and-noise ratio (SLNR) measurement. After the CxM determines the desired antenna patterns for each CBSD, these patterns will be communicated to the respective CBSDs, and each CBSD will send a grant request to its serving SAS requesting spectrum grants with the proposed antenna patterns.

In a further example, the embodiments may also be applied to mitigate interference between co-located deployments of indoor private networks, overlaid with outdoor macro networks. As a first example, the antenna patterns of the macro network CBSDs may be calculated in the CxM to minimize interference below a defined threshold T2 in the coverage area of the indoor private network from the outdoor macro network. As a second example, the antenna pattern of the macro network CBSDs may be calculated to serve one or more End User Devices (EUDs) of the macro network within the coverage area of the indoor private network. For this second example, the antenna pattern will be calculated by the CxM to ensure that the SINR of the EUD is above a defined threshold T3. After determining the desired antenna patterns for each CBSD, these patterns will be communicated by the CxM to the respective CBSDs, and each CBSD will send a grant request to its serving SAS requesting spectrum grants with the proposed antenna patterns.

In the characterization of unwanted emissions by an AAS system, 3GPP has defined the use of Total Radiated Power (TRP). Typically, TRP is equivalent to the sum of the total conducted power and the single element gain of the antenna array after accounting for total antenna efficiency. The TRP may be interpreted as the emissions averaged over the entire set of possible antenna patterns from the AAS system, under the assumption of uniform weighting of all those patterns and time division multiplexing of all the patterns. A CBSD or a network operator could carry this idea forward by a deployment-specific characterization of most likely antenna configurations, including the effect of avoiding the use of those antenna patterns that will cause high signal levels at the incumbent. This analysis of the deployment condition, in conjunction with information about the incumbent location provided by the SAS can allow the CBSD or the local network to minimize the interference towards the incumbent and at the same time allow the definition of a modified TRP. In addition, the average antenna pattern represented by the modified TRP can then be registered at the SAS.

Figure 8:
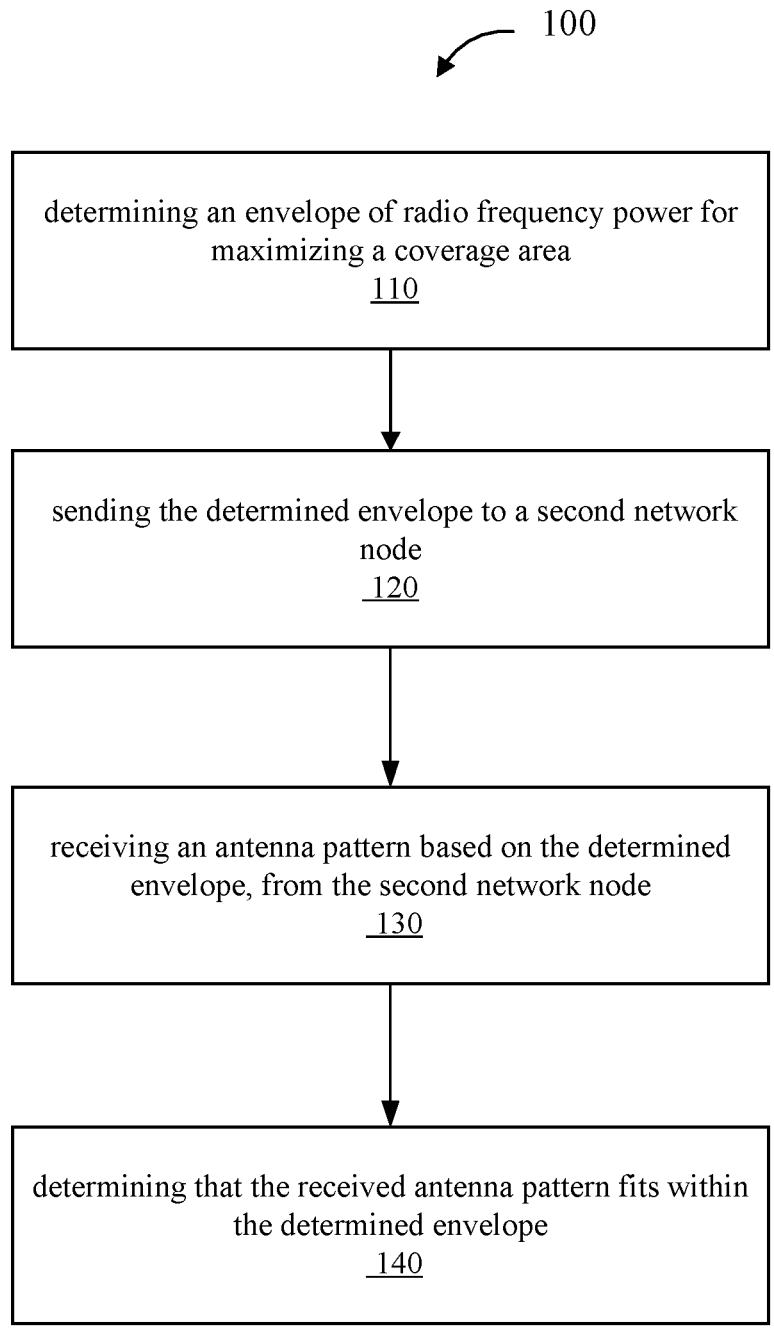
FIG. 8 is a flow chart of a method in a controlling node (e.g. SAS or CxM), in accordance with some embodiments.

Now turning to FIG. 8, a flow chart of a method 100 for adapting beam patterns or antenna patterns to protect/avoid incumbents and/or other nodes in a communication network will be described. The method can be implemented in a controlling node, such as the SAS, or CxM. Method 100 comprises:

Step 110: determining an envelope of radio frequency power for maximizing a coverage area.

Step 120: sending the determined envelope to a second network node. The second network node may be a CBSD.

Step 130: receiving an antenna pattern based on the determined envelope, from the second network node.

Step 140: determining that the received antenna pattern fits within the determined envelope.

In some examples, method 100 may further receive a request for a channel (or resources) from the second network node.

In case the received antenna pattern does not fit within the determined envelope, the controlling node rejects the request for a channel from the second network node. Then, the CBSD may calculate/determine a new or a second antenna pattern which will be sent to the controlling node (see FIG. 3).

In some examples, method 100 may further send or grant the channel (or resources) to the second network node, in response to determining that the received antenna pattern fits within the determined envelope.

In some examples, determining the envelope of radio frequency power may be based on determining an envelope that reduces radio frequency power in the direction of incumbents and/or other network nodes.

In some examples, the radio frequency power can be Equivalent Isotropically Radiated Power (EIRP).

In some examples, determining an envelope that reduces radio frequency power in the direction of incumbents and/or other network nodes may be based on using/generating nulls in beamforming in the direction of the incumbents and/or other network nodes.

In some examples, determining an envelope of radio frequency power may be based on determining an envelope for the second network node that meets interference levels (or mitigates interference) at the position of the incumbents.

In some examples, method 100 may further determine the interference levels at the incumbents' position, caused by the second network's transmission of data.

In some examples, method 100 may receive information from the second network node such as its location, maximum EIRP, antenna azimuth, etc.

In some examples, the received antenna pattern is based on a beam pattern.

Figure 9:
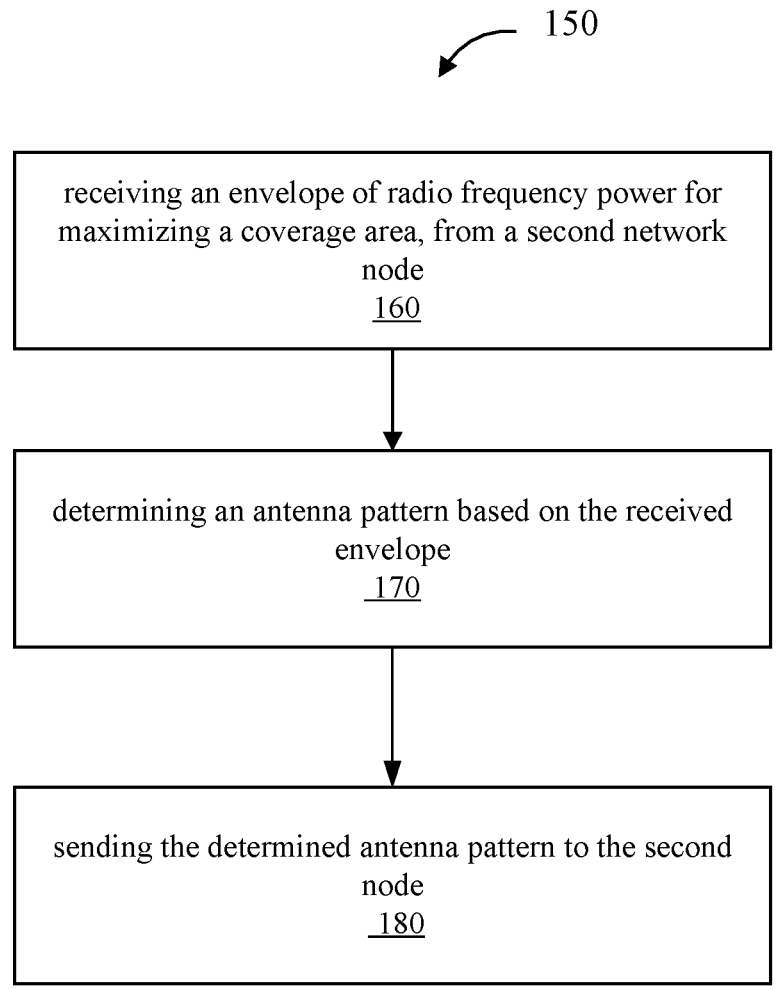
FIG. 9 is a flow chart of a method in a network node (e.g. CBSD), in accordance with some embodiments.

Now turning to FIG. 9, a flow chart of a method 150 in a first network node, such as a CBSD, will be described. Method 150 comprises:

Step 160: receiving an envelope of radio frequency power for maximizing a coverage area, from a second network node.

Step 170: determining an antenna pattern based on the received envelope.

Step 180: sending the determined antenna pattern to the second node.

In some examples, method 150 may further send a request for a channel (or resources) to the second network node. The second network node may be the SAS.

In some examples, method 150 may further receive the grant for the channel (or resources) from the second network node, in response to the second network node determining that the antenna pattern fits within the envelope.

In some examples, method 150 may further determine the antenna pattern based on a beam pattern.

In some examples, method 150 may adapt the antennas (e.g. AAS) to generate the determined beam pattern and/or the antenna pattern.

In some examples, the radio frequency power can be Equivalent Isotropically Radiated Power (EIRP).

In some examples, the envelope can reduce radio frequency power in the direction of incumbents and/or other network nodes by using nulls in beamforming in the direction of the incumbents and/or other network nodes. Furthermore, the envelope of radio frequency power can meet the interference levels (or mitigate the interference) at the position of the incumbents.

In some examples, method 150 can further send information to the second network node, such as its location, maximum EIRP, antenna azimuth, etc.

It should be noted that a beam pattern can be part of cell shaping parameters.

Radio Planning Method

After a CBSD is installed, it will be registered in an associated SAS (see step 52 of FIG. 3). Following the regular register procedure, the CBSD will report beamforming capacity to the SAS as well. The parameter of beaming capacity can include a number of radio branches or maximum layers it can support, or other information. Correspondently, the SAS will provide locations of incumbents to be protected in the area.

In a CBRS co-existence scenario, the SAS provides the CxM with a list of CBSDs in the set, information about those CBSDs, and a pool of spectrum assigned for this set. The CxM creates a 'coverage overlap graph', which represents interference relationship between grouped CBSDs. The CxM colors the map/graph and performs channel assignments.

Figure 10:
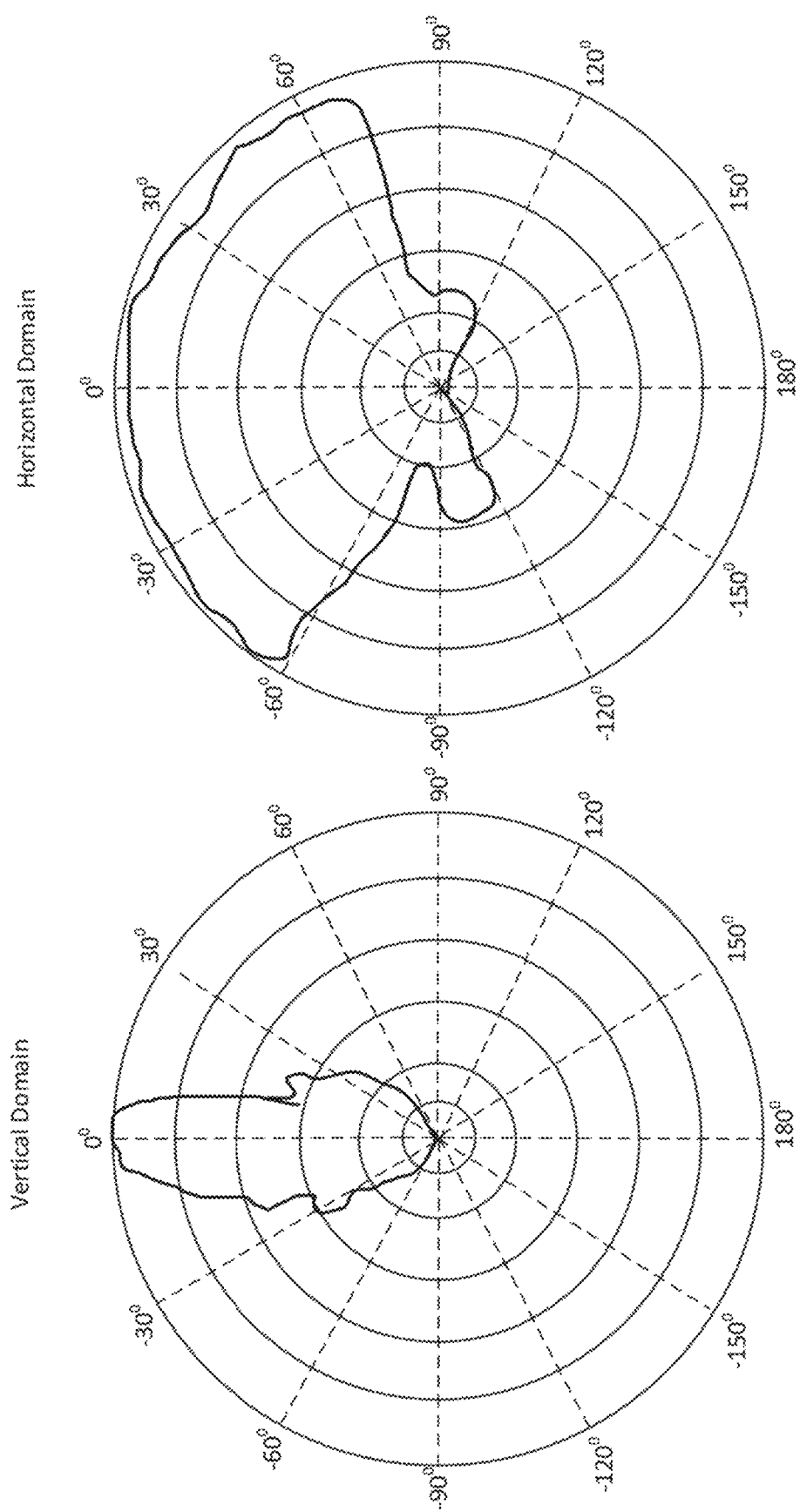
FIG. 10 illustrates a cell shaping for scenarios with small spread angle in the vertical domain.

With the characteristics of AAS, there are possibilities to generate different types of wide beams used for cell shaping, i.e. different wide beams have different beam width horizontally and vertically, so that they have different coverage/service area. The CBSD can switch to different wide beams according to a user distribution or user traffic distribution. For example, if most users are distributed within a small spread angle in the vertical domain/dimension, a wide beam in the horizontal dimension with a smaller beam width in the vertical is preferred, see FIG. 10, which illustrates a cell shaping for scenarios with a small spread angle in the vertical domain/dimension and with the wide beam in the horizontal dimension.

Figure 11:
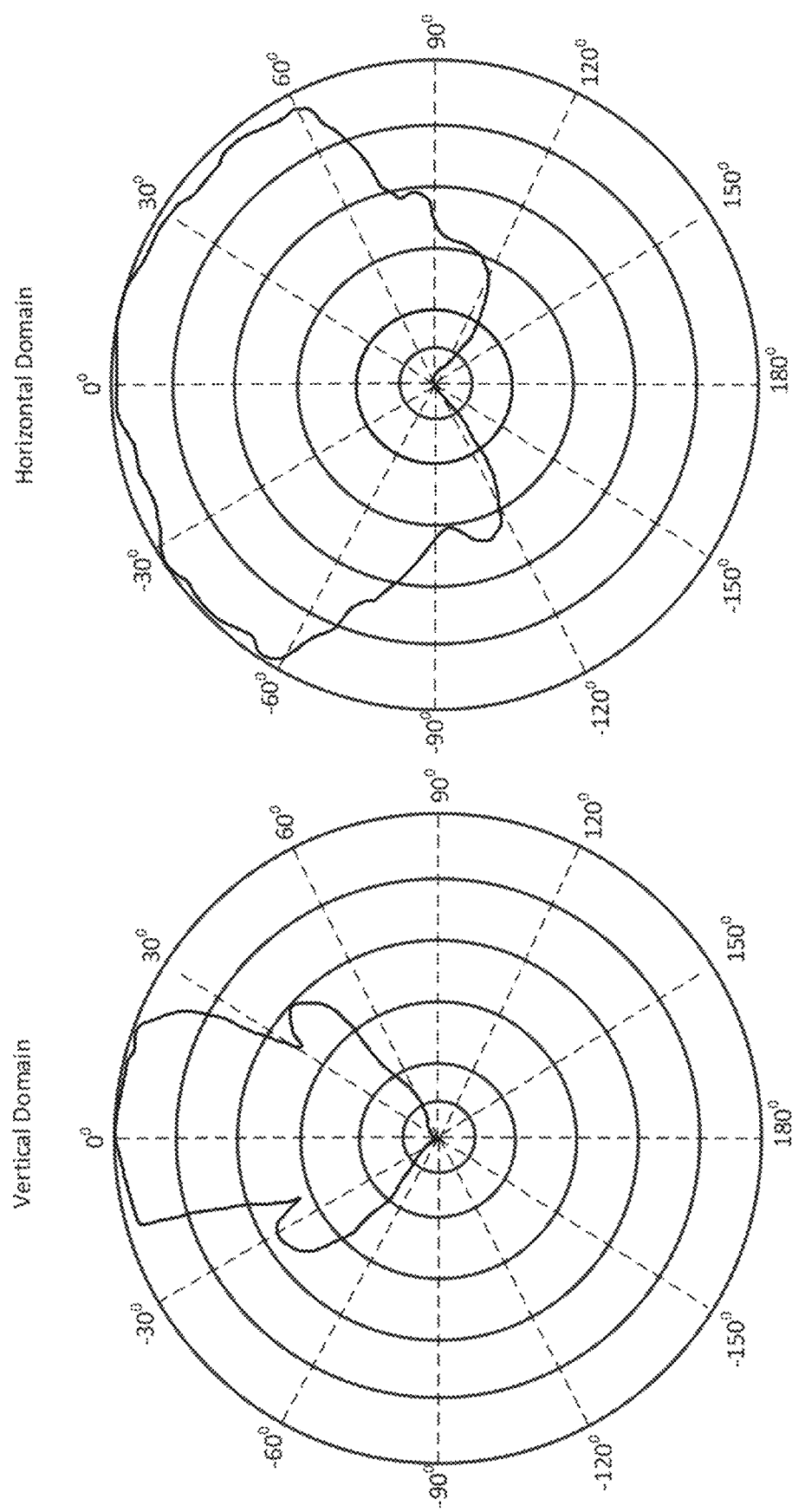
FIG. 11 illustrates a cell shaping for scenarios with large spread angle in the vertical domain.

If the user distribution in the vertical domain is within a large spread angle, a wide beam in the horizontal dimension with a larger beam width in the vertical dimension is preferred, see FIG. 11, which illustrates a cell shaping for scenarios with a large spread angle in the vertical domain and with the wide beam in the horizontal dimension.

The CBSD can monitor a user distribution, for example, through positioning services or by tracking of departure/arrival angles in the vertical and horizontal domains, or through Timing Advance (TA), for example.

Cell shaping can include beam patterns and selecting different wide beams and adjusting the tilts. For example, changing the tilt alters the range of the coverage; as such, this is cell shaping in the vertical domain as opposed to beamforming which usually is cell shaping in the azimuthal plane but can also be in the vertical plane. In fact, a beamformer can jointly determine the most suitable beam pattern in the vertical and horizontal planes simultaneously. More specifically, the CBSD will calculate an optimum tilt value for each sector in order to mitigate interference from neighbor networks and incumbents. This tilt value should be applied in an electrical or digital or mechanical tilt. The initial tilt value of the CBRS band can be set by following the normal LTE and NR antenna tilt guideline during the installation. The CBSD will monitor an uplink (UL) interference from neighbor cells and check the direction of the incumbents. If the interference level is higher than a predefined threshold, the CBSD can down tilt the sector's antenna to a new tilt value (e.g. Tilt 1) based on the initial tilt value. The CBSD can check the direction of the incumbents and can down tilt the sectors which could interfere with the incumbents potentially.

The CBSD can report, to a SAS/CxM, the optimum tilt value and cell IDs which are exposed to high interference from the neighbor cells (i.e. interference geometry). Then, the SAS/CxM can coordinate all grouped CBSDs and might send new suggested down tilt values to CBSDs to get more measurement results and wait for measurement results from the CBSDs. After the handshaking is done for the new cell shaping parameters, the SAS/CxM can reallocate the spectrum to the CBSDs from the pool of spectrum.

Figure 12:
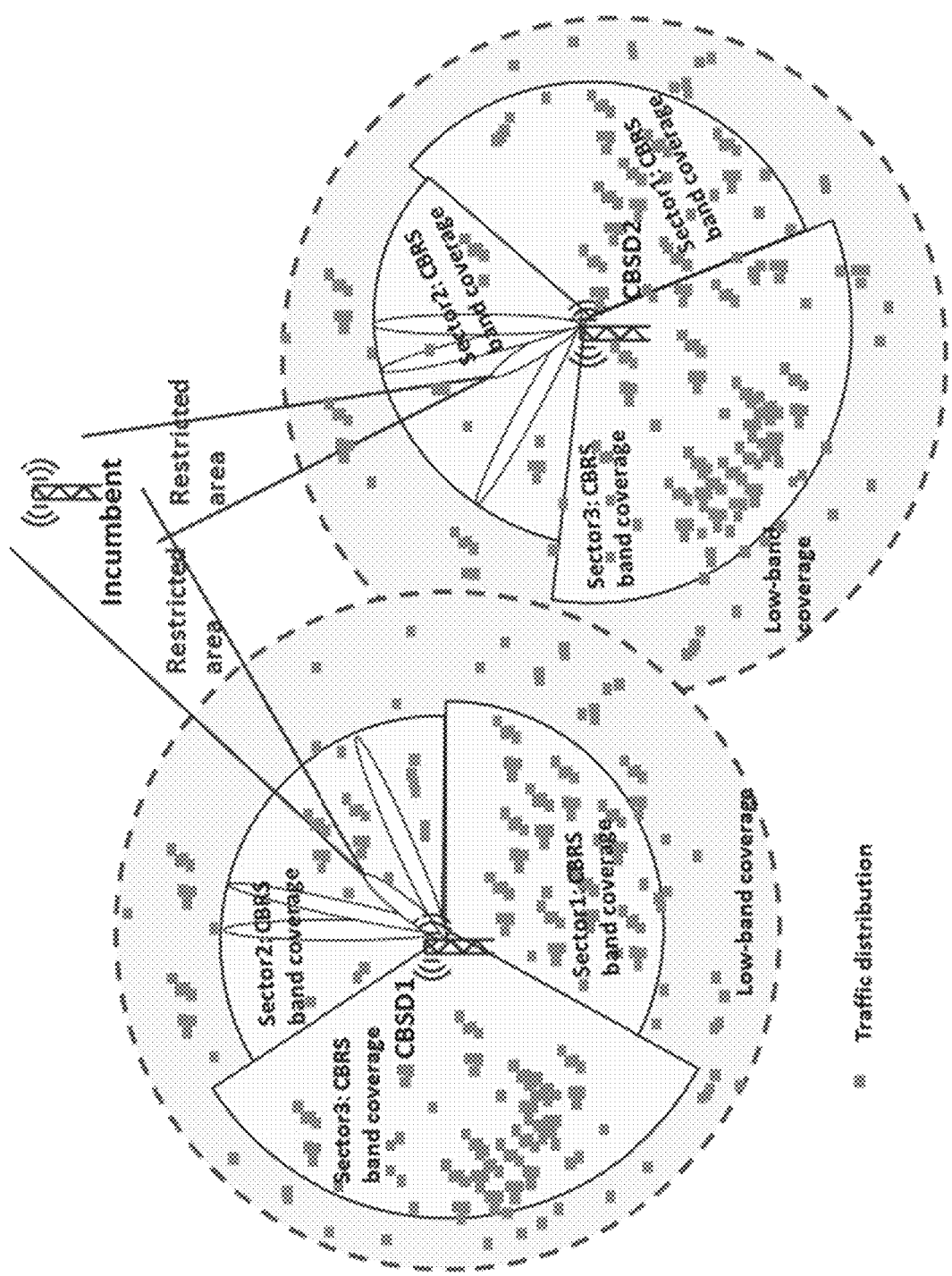
FIG. 12 illustrates an example to calculate expected service area with different wide beams and tilt values.

FIG. 12 illustrates an example of expected service areas calculated with different wide beams and tilt values. More specifically, different coverages in different sectors are determined based on antenna downtilt/tilt to minimize the EIRP towards the incumbent as well as beam patterns that minimize the EIRP towards the incumbent (i.e. in sector 2).

Figure 13:
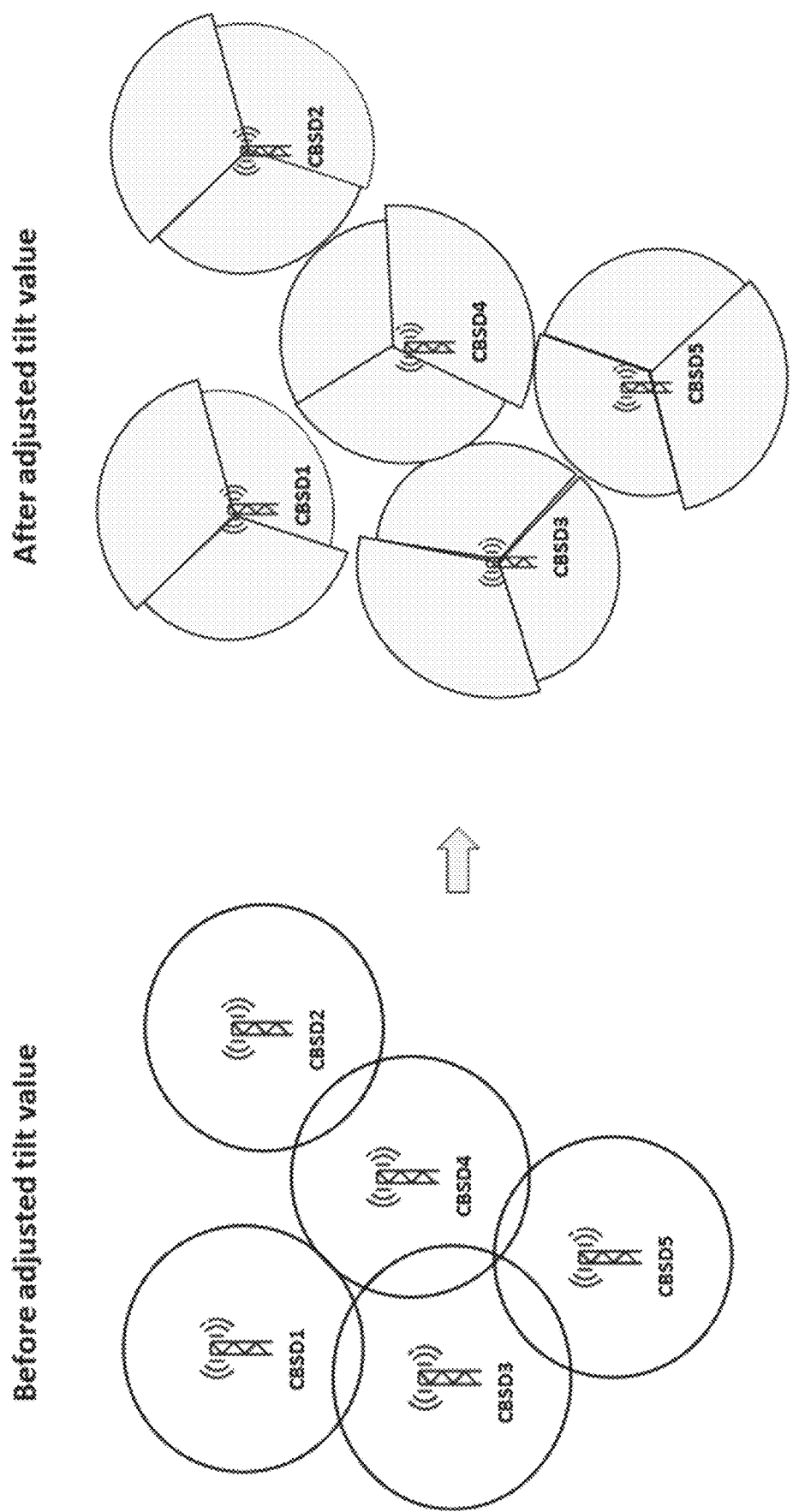
FIG. 13 illustrates an example of a service area before and after adjusted tilt value.

FIG. 13 illustrates an example of a service area before and after adjusted tilt value. More specifically, FIG. 13 illustrates how the service area coverage for each sector in a cell can be adjusted by the antenna downtilt/tilt in that sector. This will also impact the EIRP within the sector.

FIG. 14 illustrates an example of a spectrum assignment before and after adjusted tilt value. More specifically, FIG. 14 shows that, before downtilt/tilt, CBSDs 1, 3 and 4 are interfering with each other as shown by the connecting lines, and hence have to use orthogonal or different parts of the band (i.e. BW1, BW2 and BW3). After downtilt, the interference between the CBSDs is below an acceptable threshold (i.e. no connecting lines) and all the CBSDs can use all of the BW1, BW2 and BW3 spectrum resources.

Figure 15:
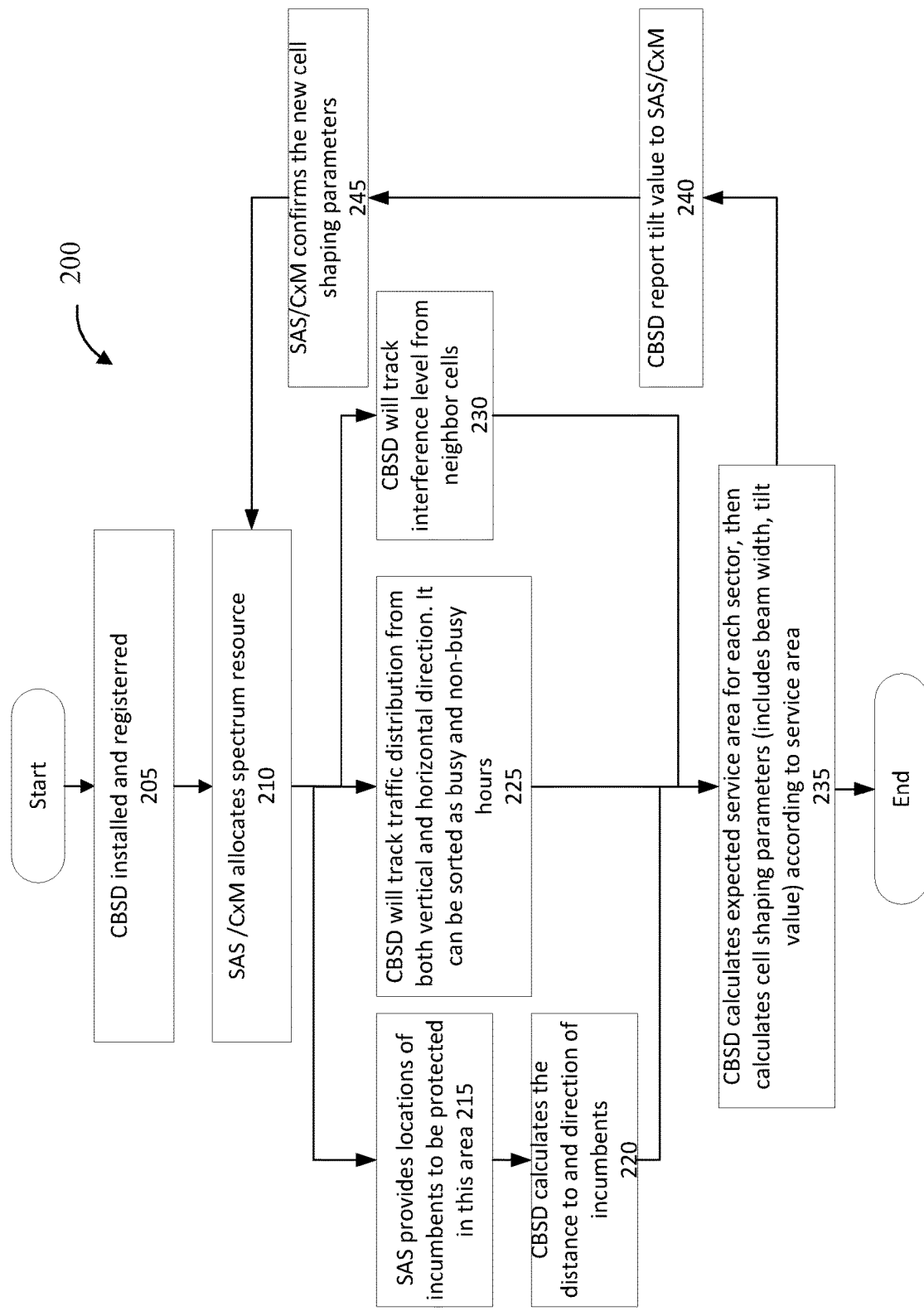
FIG. 15 illustrates an exemplary flow chart of a method in the CBRS architecture, according to some embodiments.

FIG. 15 illustrates a flow chart of a method 200 for allocating spectrum/resources in a network node, based on user traffic distribution and beam width and tilt determination, for example.

The method 200 starts with a CBSD being installed and registered (step 205).

In step 210, the SAS/CxM allocates spectrum resources to the CBSD and other network nodes, such as CBSDs.

In step 215, the SAS provides locations of incumbents to be protected in an area/coverage area.

In step 220, the CBSD calculates the distance to incumbents and the direction of the incumbents.

In step 225, the CBSD can track traffic distribution from both the vertical and horizontal directions. It can be further sorted as busy and non-busy hours.

In step 230, the CBSD can track the interference level from neighbor cells.

In step 235, the CBSD can calculate/determine an expected service area for each sector, based on all the information received from steps 220, 225 and 230, such as the distance and direction of the incumbents, the traffic distribution and interference level from the neighbor cells. Then, the CBSD can calculate cell shaping parameters (including beam width and tilt values) according to the determined service area.

In step 240, the CBSD reports the tilt value to the SAS/CxM.

In step 245, the SAS/CxM confirms the new cell shaping parameters.

The method can go back to step 210 where the SAS/CxM can allocate spectrum resources according to the new cell shaping parameters.

Figure 16:
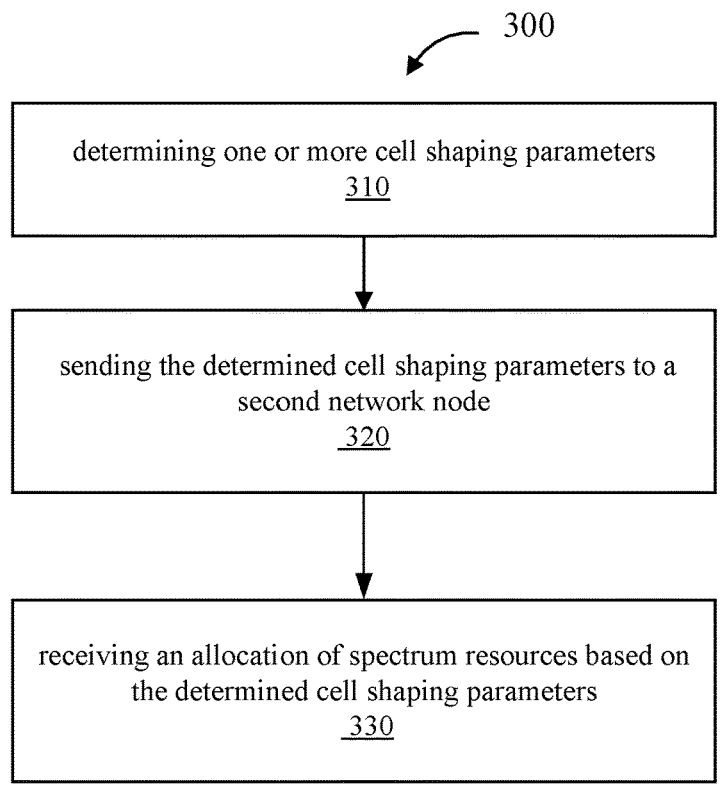
FIG. 16 is a flow chart of a method in a network node (e.g. CBSD), in accordance with some embodiments.

FIG. 16 illustrates a flow chart of a method 300 for adapting AAS or beams to protect/avoid incumbents and/or other nodes in a communication network.

Method 300 can be implemented in a network node/controlling node, such as a SAS or CxM, for example. Method 300 comprises:

Step 310: determining one or more cell shaping parameters;

Step 320: sending the determined cell shaping parameters to a second network node;

Step 330: receiving an allocation of spectrum resources based on the determined cell shaping parameters.

Method 300 can be used for radio planning. In this case, the cell shaping parameters may comprise beam width and tilt. The second network node may be a CBSD.

For example, in some examples, determining cell shaping parameters can comprise determining a beam width. For example, a beam width can be determined based on a traffic distribution in a vertical direction and/or a horizontal direction. The traffic distribution in a vertical direction and/or a horizontal direction can be determined based on positioning services and/or tracking of departure/arrival angles in the vertical and horizontal domains.

In some examples, determining cell shaping parameters can comprise determining a beam tilt. For example, a beam tilt can be determined based on an interference level of neighbor cells/networks. If the interference level is higher than a threshold value, the tilt can be brought to a lower value. Furthermore, the beam tilt can be an electrical tilt or a digital or a mechanical tilt.

In some examples, method 300 may further adapt antennas to have the determined beam width and/or tilt.

Method 300 may be also used for negotiating an AAS Antenna Pattern. In this case, the cell shaping parameters may comprise a beam pattern.

For example, in some examples, determining one or more cell shaping parameters may comprise determining a beam pattern.

In some examples, method 300 may further receive an envelope of radio frequency power.

In some examples, method 300 may further send a request for a channel (or resources) to the second network node.

In some examples, receiving an allocation of resources based on the determined cell shaping parameters may be in response to the second network node determining that an antenna pattern generated based on the beam pattern fits within the envelope.

In some examples, determining a beam pattern can comprise nulling one or more beams in the direction of incumbents and/or other network nodes.

In some examples, method 300 may further adapt antennas to generate the determined beam pattern/antenna pattern.

In some examples, the radio frequency power can be Equivalent Isotropically Radiated Power (EIRP).

Figure 17:
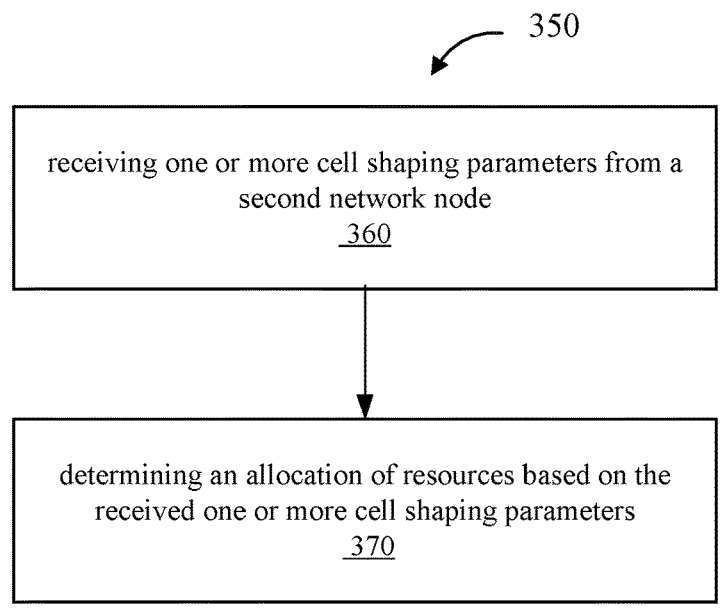
FIG. 17 is a is a flow chart of a method in a network node (e.g. SAS, CxM), in accordance with some embodiments.

Now turning to FIG. 17, a flow chart of a method 350 for adapting AAS and beam parameters to avoid/protect incumbents and/or other network nodes in a communication network will be described. The method may be implemented in a network node/controlling node, such as SAS. Method 350 comprises:

Step 360: receiving one or more cell shaping parameters from a second network node (e.g. CBSD);

Step 370: determining an allocation of resources based on the received one or more cell shaping parameters.

In some examples, method 350 may further send the allocation of resources to the second network node.

In some examples, method 350 may further send locations of incumbents to be protected in a service area, to the second network node.

In some examples, the allocation of resources changes a previous allocation of resources to the second network node (e.g. CSBD).

In some examples, the one or more cell shaping parameters may comprise one or more of a beam width, tilt and beam pattern.

Figure 18:
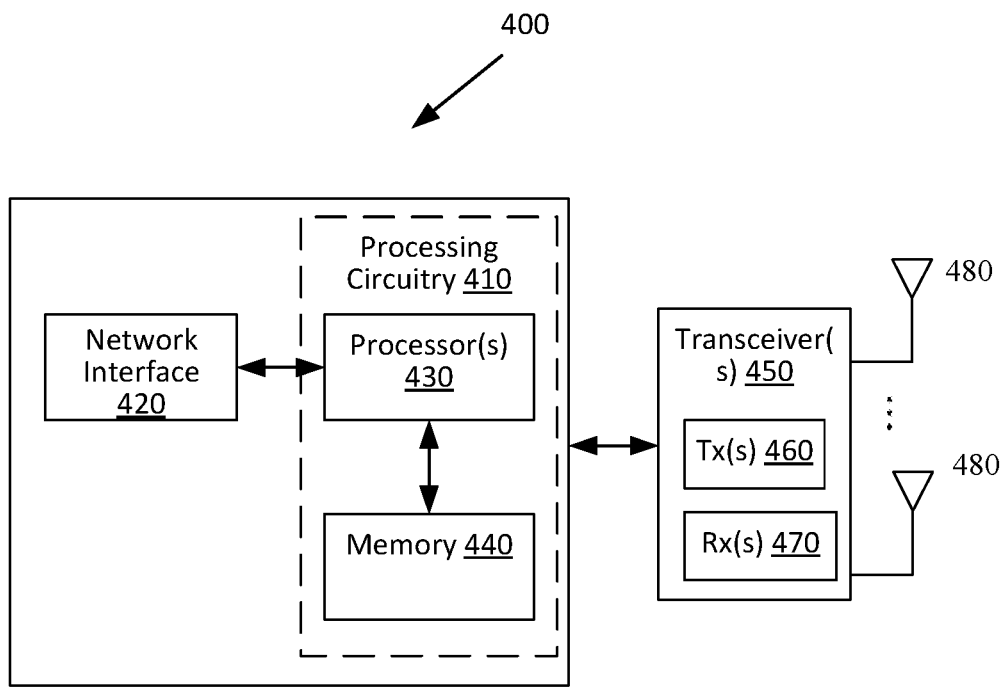
FIGS. 18 and 19 are block diagrams that illustrate a network node/controlling node according to some embodiments of the present disclosure.

FIG. 18 is a schematic block diagram of a network node 400 according to some embodiments of the present disclosure. As illustrated, the network node 400 includes a processing circuitry 410 comprising one or more processors 430 (e.g., CPUs, ASICs, FPGAs, and/or the like) and memory 440. The network node also comprises a network interface 420. The network node 400 also includes one or more transceivers 450 that each include one or more transmitters 460 and one or more receivers 470 coupled to one or more antennas 480. In some embodiments, the functionality of the network node 400 described above may be fully or partially implemented in software that is, e.g., stored in the memory 440 and executed by the processor(s) 430. For example, the processor 430 can be configured to perform any one of the methods 100 of FIG. 8, method 150 of FIG. 9, method 200 of FIG. 15, method 300 of FIG. 16, and method 350 of FIG. 17. The network node 400 could be a SAS or a CBSD. In case of the SAS, the transceivers 450 and antennas 480 are not necessary.

Figure 19:
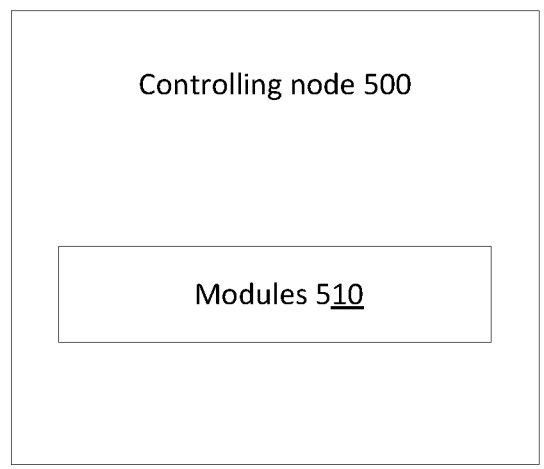

FIG. 19 is a schematic block diagram of the network node or controlling node 600 according to some other embodiments of the present disclosure. The network node 600 includes one or more modules 600, each of which is implemented in software. The module(s) 600 provide the functionality of the network node 600 described herein. The module(s) 600 may comprise, for example, a plurality of modules operable to perform any of the steps of method 100 of FIG. 8, method 150 of FIG. 9, method 200 of FIG. 15, method 300 of FIG. 16, and method 350 of FIG. 17.

Figure 20:
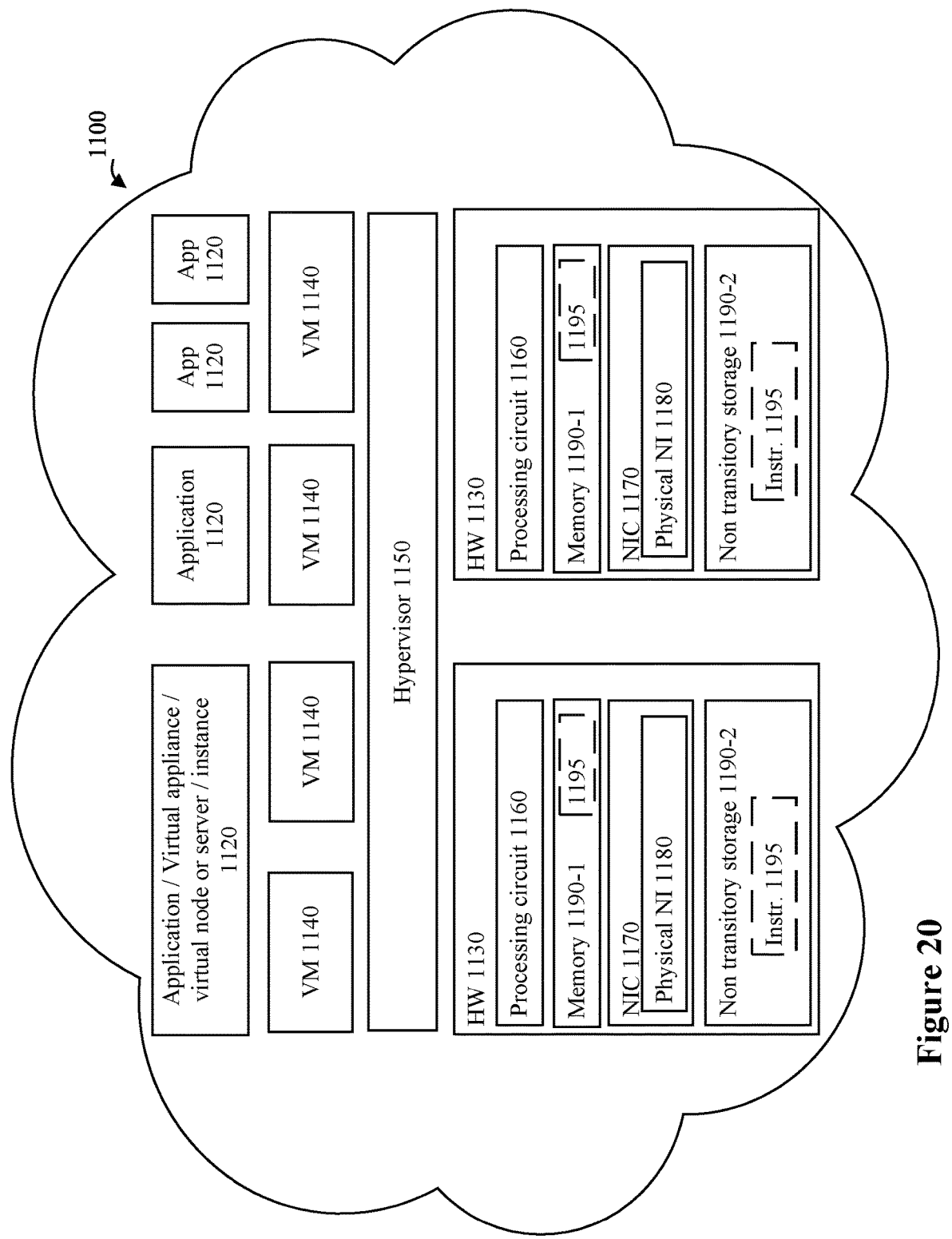
FIG. 20 illustrates a virtualized environment of a network node, according to some embodiments of the present disclosure.

FIG. 20 is a schematic block diagram that illustrates a virtualized embodiment of the network node 400, according to some embodiments of the present disclosure. As used herein, a "virtualized" node 1100 is a network node 400 in which at least a portion of the functionality of the network node 400 is implemented as a virtual component (e.g., via a virtual machine(s) executing on a physical processing node(s) in a network(s)). For example, in FIG. 20, there is provided an instance or a virtual appliance 1120 implementing the methods or parts of the methods of some embodiments. The one or more instance(s) runs in a cloud computing environment 1100. The cloud computing environment provides processing circuits 1130 and memory 1190-1 for the one or more instance(s) or virtual applications 1120. The memory 1190-1 contains instructions 1195 executable by the processing circuit 1160 whereby the instance 1120 is operative to execute the methods or part of the methods described herein in relation to some embodiments.

The cloud computing environment 1100 comprises one or more general-purpose network devices including hardware 1130 comprising a set of one or more processor(s) or processing circuits 1160, which may be commercial off-the-shelf (COTS) processors, dedicated Application Specific Integrated Circuits (ASICs), or any other type of processing circuit including digital or analog hardware components or special purpose processors, and network interface controller(s) (NICs) 1170, also known as network interface cards, which include physical Network Interface 1180. The general-purpose network device also includes non-transitory machine readable storage media 1190-2 having stored therein software and/or instructions 1195 executable by the processor 1160. During operation, the processor(s)/processing circuits 1160 execute the software/instructions 1195 to instantiate a hypervisor 1150, sometimes referred to as a virtual machine monitor (VMM), and one or more virtual machines 1140 that are run by the hypervisor 1150.

A virtual machine 1140 is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes. Each of the virtual machines 1140, and that part of the hardware 1130 that executes that virtual machine 1140, be it hardware 1130 dedicated to that virtual machine 1140 and/or time slices of hardware 1130 temporally shared by that virtual machine 1140 with others of the virtual machine(s) 1140, forms a separate virtual network element(s) (VNE).

The hypervisor 1150 may present a virtual operating platform that appears like networking hardware to virtual machine 1140, and the virtual machine 1140 may be used to implement functionality such as control communication and configuration module(s) and forwarding table(s), this virtualization of the hardware is sometimes referred to as network function virtualization (NFV). Thus, NFV may be used to consolidate many network equipment types onto industry standard high volume server hardware, physical switches, and physical storage, which can be located in Data centers, and customer premise equipment (CPE). Different embodiments of the instance or virtual application 1120 may be implemented on one or more of the virtual machine(s) 1140, and the implementations may be made differently.

In some embodiments, a carrier comprising the aforementioned computer program product is provided. The carrier is one of an electronic signal, an optical signal, a radio signal, or a computer readable storage medium (e.g., a non-transitory computer readable medium such as memory).

Some embodiments may be represented as a non-transitory software product stored in a machine-readable medium (also referred to as a computer-readable medium, a processor-readable medium, or a computer usable medium having a computer readable program code embodied therein). The machine-readable medium may be any suitable tangible medium including a magnetic, optical, or electrical storage medium including a diskette, compact disk read only memory (CD-ROM), digital versatile disc read only memory (DVD-ROM) memory device (volatile or non-volatile), or similar storage mechanism. The machine-readable medium may contain various sets of instructions, code sequences, configuration information, or other data, which, when executed, cause a processor to perform steps in a method according to one or more of the described embodiments. Those of ordinary skill in the art will appreciate that other instructions and operations necessary to implement the described embodiments may also be stored on the machine-readable medium. Software running from the machine-readable medium may interface with circuitry to perform the described tasks.

The above-described embodiments are intended to be examples only. Alterations, modifications and variations may be effected to the particular embodiments by those of skill in the art without departing from the scope of the description, which is defined solely by the appended claims.

What is claimed is:

1. A method in a first network node, the method comprising:
   determining an envelope of radio frequency power that maximizes a coverage area;
   sending the determined envelope to a second network node;
   receiving an antenna pattern based on the determined envelope, from the second network node; and
   in response to determining that the received antenna pattern fits within the determined envelope, granting a channel to the second network node.

2. The method of claim 1, further comprising receiving a request for the channel from the second network node.

3. The method of claim 1, wherein determining an envelope of radio frequency power comprises determining an envelope that reduces radio frequency power in direction of one of more of incumbents and other network nodes.

4. The method of claim 1, wherein the radio frequency power is an Equivalent Isotropically Radiated Power (EIRP).

5. The method of claim 3, wherein determining an envelope that reduces radio frequency power in direction of one or more of incumbents and other network nodes comprises using nulls in beamforming in the direction of the one or more of the incumbents and other network nodes.

6. The method of claim 1, wherein determining an envelope of radio frequency power comprises determining an envelope for the second network node that meets interference levels at a position of the incumbents.

7. The method of claim 6, further comprising determining the interference levels at the incumbents' position, the interference levels caused by the second network's transmission of data.

8. The method of claim 1, further comprising receiving information from the second network node, the information including one or more of a location of the second network node, a maximum EIRP, and an antenna azimuth.

9. The method of claim 1, wherein the received antenna pattern is based on a beam pattern.

10. A method in a first network node, the method comprising:
    receiving an envelope of radio frequency power for maximizing a coverage area, from a second network node;
    determining an antenna pattern based on the received envelope;
    sending the determined antenna pattern to the second node; and
    receiving a grant for a channel from the second network node, in response to the second network node determining that the antenna pattern fits within the envelope.

11. The method of claim 10, further comprising sending a request for the channel to the second network node.

12. The method of claim 10, further comprising adapting antennas to generate the determined antenna pattern.

13. The method of claim 10, wherein the radio frequency power is an Equivalent Isotropically Radiated Power (EIRP).

14. The method of claim 10, wherein the envelope reduces radio frequency power in a direction of one or more of incumbents and other network nodes by using nulls in beamforming in the direction of the one or more of incumbents and other network nodes.

15. The method of claim 10, wherein the envelope of radio frequency power mitigates interference levels at a position of the incumbents.

16. The method of claim 10, further comprising sending information to the second network node, the information including a location of the second network node, a maximum EIRP, and an antenna azimuth.

17. The method of claim 10, wherein determining the antenna pattern is based on a beam pattern.

18. A network node comprising a communication interface and processing circuitry connected thereto and configured to:
   determine an envelope of radio frequency power that maximizes a coverage area;
   send the determined envelope to a second network node;
   receive an antenna pattern based on the determined envelope, from the second netword node; and
   in response to determining that the received antenna pattern fits within the determined envelope, grant a channel to the second network node.

* * * * *